United States Patent [19]
Eckert

[11] Patent Number: 6,033,037
[45] Date of Patent: Mar. 7, 2000

[54] BRAKE SYSTEM FOR MOTOR VEHICLES

[75] Inventor: Alfred Eckert, Bodenheim, Germany

[73] Assignee: ITT Manufacturing Enterprises Inc., Wilmington, Del.

[21] Appl. No.: 08/894,426

[22] PCT Filed: Feb. 24, 1996

[86] PCT No.: PCT/EP96/00771

§ 371 Date: Oct. 3, 1997

§ 102(e) Date: Oct. 3, 1997

[87] PCT Pub. No.: WO96/28330

PCT Pub. Date: Sep. 19, 1996

[51] Int. Cl.$^7$ ................................. B60T 8/44; B60T 8/34
[52] U.S. Cl. ..................................... 303/114.3; 303/113.2
[58] Field of Search ............................ 303/113.2, 113.3, 303/113.4, 113.5, 114.3; 91/369.1, 369.2, 374, 376 R; 60/545, 547.1; 188/356

[56] References Cited

U.S. PATENT DOCUMENTS 5,496,099  3/1996  Resch ................................. 303/114.1
5,725,291  3/1998  Michels ................................. 303/125

Primary Examiner—Chris Schwartz
Attorney, Agent, or Firm—Rader, Fishman & Grauer PLLC

[57] ABSTRACT

A brake system for automotive vehicles includes a pneumatic brake power booster with a control valve which is operable by a solenoid irrespective of the driver's wish. A control structure having a position controller which influences the position of the control valve provides the signals representative of voltage which are supplied to the solenoid. To achieve a comfortable, exactly controllable independent operation of the brake power booster, the position controller is provided by a comparator, connected upstream of which is a second summer wherein the output quantity of the deceleration controller is compared with a weighted signal representative of the speed of the armature. The output quantity of the deceleration controller corresponds to the position of the armature relative to the housing of the solenoid, and the travel signal which corresponds to the actual condition of the control valve represents the actual position of the armature relative to the housing of the solenoid.

10 Claims, 6 Drawing Sheets

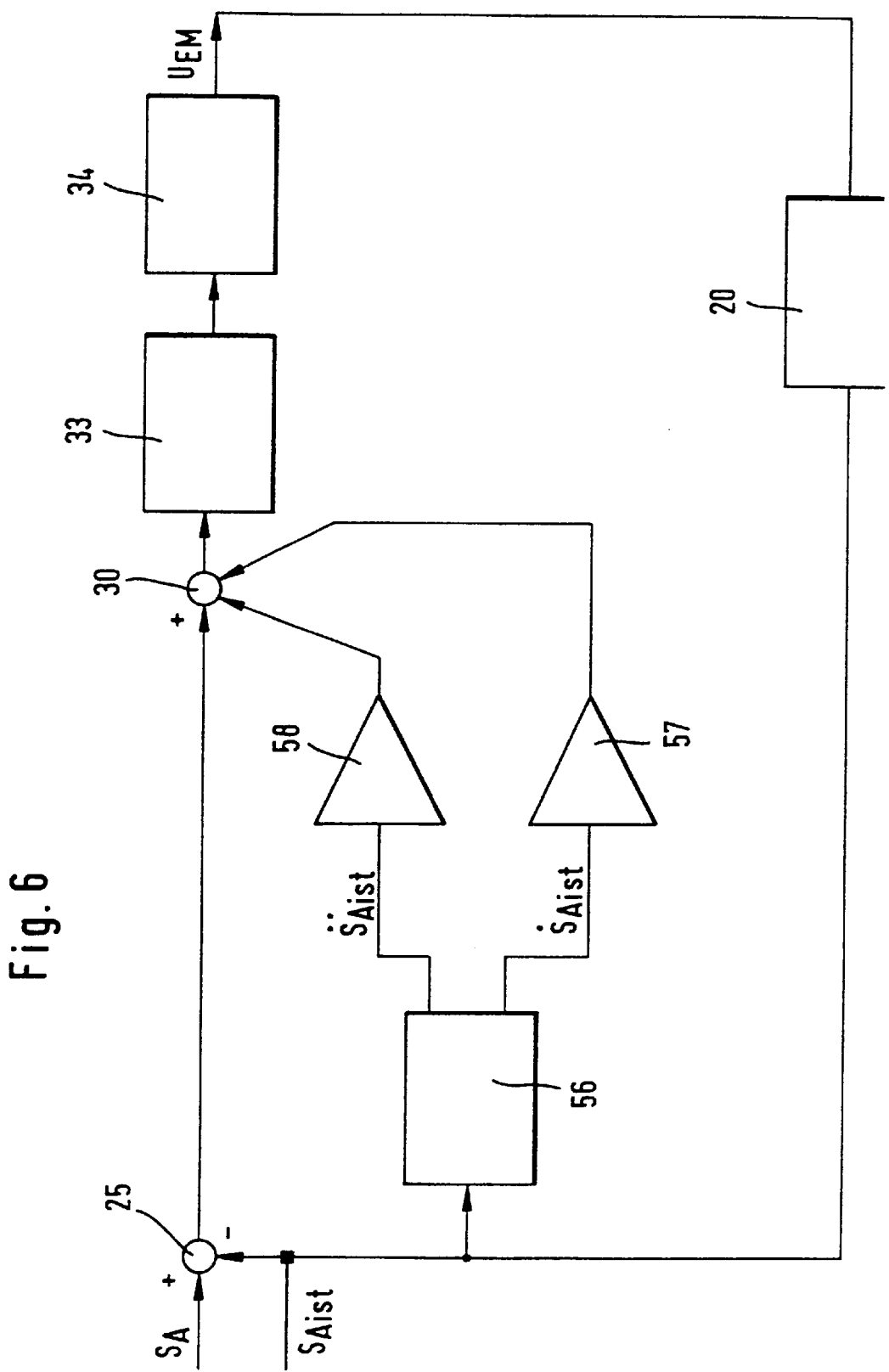

BRAKE SYSTEM FOR MOTOR VEHICLES

BACKGROUND OF THE INVENTION

The present invention relates to a brake system for automotive vehicles with an actuating unit including a pneumatic brake power booster and a master brake cylinder connected downstream of the booster and connected to wheel brakes, wherein a control valve of the brake power booster is operable irrespective of the driver's wish by a solenoid having an armature that is in force-transmitting connection with one of the sealing seats of the control valve, a deceleration controller to which a signal representative of the vehicle deceleration is sent as an input quantity, wherein the output quantity of the controller influences the position of the control valve and is compared in a first summer with a signal representative of the actual condition of the control valve, and the control difference representative of the result of the comparison is sent to a position controller, which influences the position of the control valve, and the output quantity of which corresponds to an electric current to be supplied to the solenoid.

International patent application WO 95/03196 discloses a brake system of this type. The control difference between a deceleration wish signal and an actual deceleration signal, which corresponds to a quantity proportional to the brake force (brake force nominal or actual value), is sent as an input quantity to the deceleration controller of the above mentioned prior art brake system. In particular the braking pressure, the pressure differential acting in the pneumatic brake power booster, or the rotational speed of at least one vehicle wheel may be used as possible physical parameters. In response to the physical parameter chosen, the deceleration controller is configured as a braking pressure controller, pneumatic differential pressure controller, or wheel deceleration controller. Corresponding to the control difference and the demanded nominal value gradient, the deceleration controller calculates the desired position for the armature of the solenoid which directly influences the opening condition of the control valve of the brake power booster.

The output signals of the deceleration controller, in consideration of sensed actual values for the armature position and the current supplied to the solenoid, are further processed in a position controller having an output quantity which represents the control quantity for actuating the solenoid.

In particular the following problems occur in the state of the art position control of the solenoid:

1. A statically non-linear system performance of the solenoid, which is due to the non-linear progressive interrelation between the magnetic force and the process parameters 'magnetic current' and 'armature position'. This means a structurally inherent instability for the solenoid.
2. In general, a high degree of dynamics and a weak system damping.
3. The force which counteracts the solenoid upon actuation of the control valve (control valve characteristic curve) is non-linear to a great degree and, in addition, responsive to position and vacuum. After the control valve is opened, the counterforce will be reduced to such an extent as to exert an additional destabilizing effect on the solenoid.

OBJECT OF THE INVENTION

Therefore, an object of the present invention is to disclose measures permitting a control with the following characteristics:

great amount of rigidity high degree of dynamics (characteristic values of the controlled system<1 msec)

low cost small mounting space for the installation of the control electronics directly on the brake power booster high malfunction resistance.

Further, the position controller must be able to accurately position the armature of the solenoid and, thus, a sleeve which carries the mentioned control valve sealing seat even in the unstable range of the brake system characteristics.

SUMMARY OF THE INVENTION

According to the present invention, this object is achieved because the position controller is a comparator connected upstream of which is a second summer wherein the output quantity of the deceleration controller is compared with a weighted signal representative of the speed of the armature, the output quantity of the deceleration controller corresponds to the position of the armature relative to the housing of the solenoid, and the travel signal representative of the actual condition of the control valve represents the actual position of the armature in relation to the housing of the solenoid.

Further details, features and advantages of the present invention can be seen in the following description of an embodiment, making reference to the accompanying drawings in which like reference numerals have been assigned to like individual components.

BRIEF DESCRIPTION OF THE DRAWINGS

In the drawings,

FIG. 6 is a block diagram of a third embodiment of the control structure connected downstream of the deceleration controller of FIG. 1.

DETAILED DESCRIPTION OF THE DRAWINGS

Figure 1:
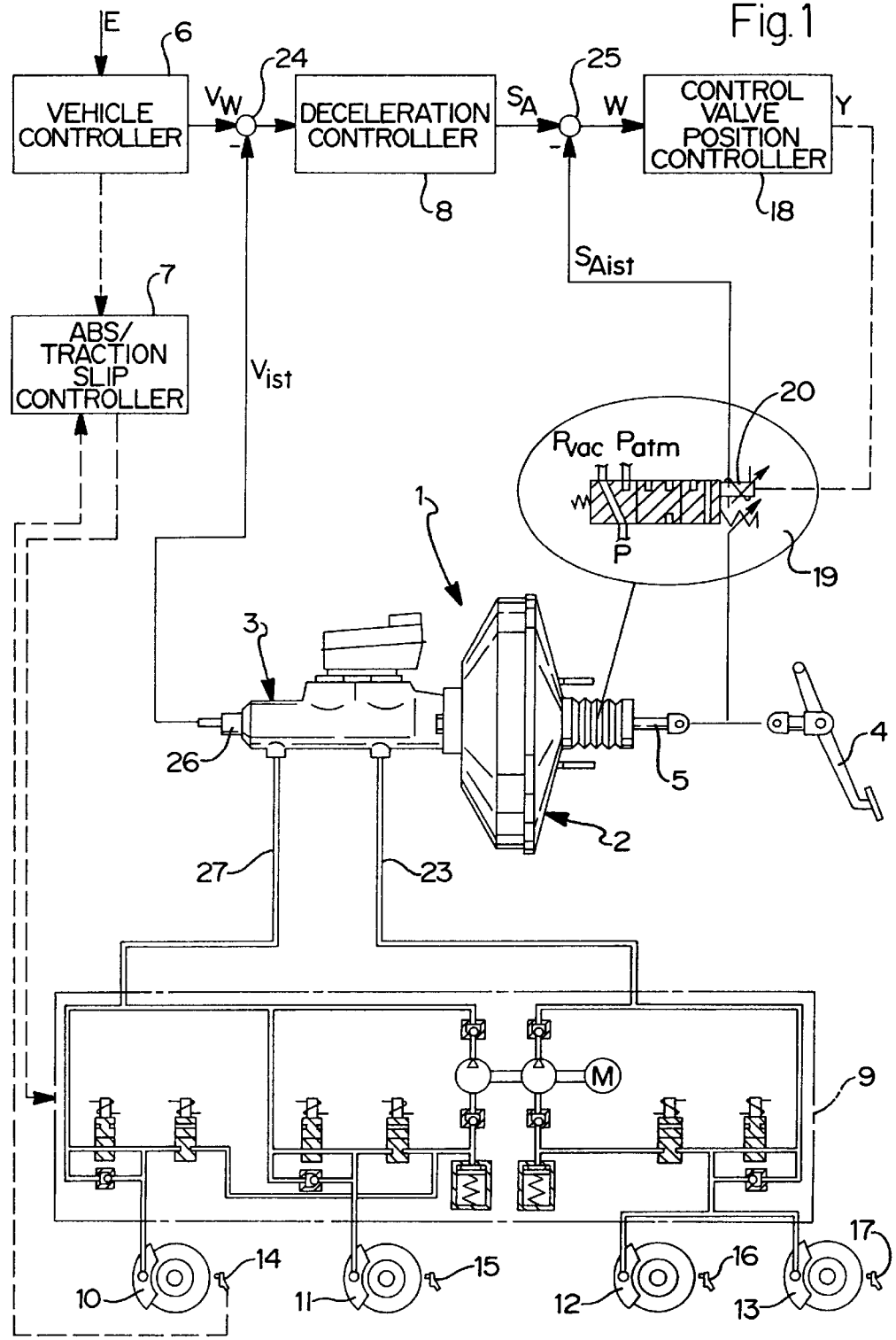
FIG. 1 is a schematic view of the design of the brake system of the present invention.

The brake system for automotive vehicles according to the present invention, shown in FIG. 1, generally includes an actuating unit 1, an electronic vehicle controller 6, wheel brakes 10, 11, 12, 13, a pressure modulator 9 arranged between the wheel brakes 10 to 13 and the actuating unit 1, and an anti-lock/traction slip controller 7 which interacts with the vehicle controller 6 and generates control signals for the pressure modulator 9. Associated with each of the vehicle wheels (not shown) is a wheel sensor 14, 15, 16, 17 having a control signal representative of the wheel speed which is sent to the anti-lock/traction slip controller 7. The actuating unit 1, in turn, includes a pneumatic brake power booster, preferably a vacuum brake power booster 2, operable by an actuating pedal 4. Connected downstream of brake power booster 2 is a master brake cylinder 3, preferably a tandem master cylinder, having pressure chambers (not shown) which are connected to the pressure modulator 9 by way of hydraulic lines 23, 27. An actuating rod 5 is coupled to the actuating pedal 4 and permits operation of a control valve 19 (shown only schematically) which governs the build-up of a pneumatic differential pressure in the housing of the vacuum brake power booster 2. A solenoid 20 permits independent operation of the control valve 19.

As can further be taken from FIG. 1, a second electronic controller (deceleration controller) 8 is connected downstream of the vehicle controller 6, and a control structure 59 is connected downstream of the electronic controller 8. A deceleration wish signal $V_w$, which is generated by the vehicle controller 6 on the basis of an input signal E supplied, for example, by a distance sensor, is sent to controller 8. The signal $V_w$ is compared in a (first) summer 24 with an actual deceleration value $V_{ist}$ which is furnished by the actuating unit 1. The resultant control difference is sent to the deceleration controller 8 having an output signal $S_{AW}$ which corresponds to the desired adjusted position of the armature of the solenoid 20 that actuates the control valve 19. The armature position nominal value $S_{AW}$ is compared in a second summer 25 with an actual value $S_{Aist}$ of the control valve position (which value can be found by a travel sensor (not shown), for example), and the resulting control difference W is sent to a subordinate third controller (control valve position controller 18) having a control variable Y which is used to actuate the solenoid 20. It is appropriate that the deceleration wish signal $V_w$ corresponds to a nominal value corresponding to the brake force, for example, a braking pressure value. In this case, the actual deceleration value $V_{ist}$ corresponds to a pressure value which is ascertained in the master brake cylinder 3 by a pressure sensor 26. The second controller or deceleration controller 8 which is superior to the third controller 18 is then configured as a braking pressure controller.

Figure 2:
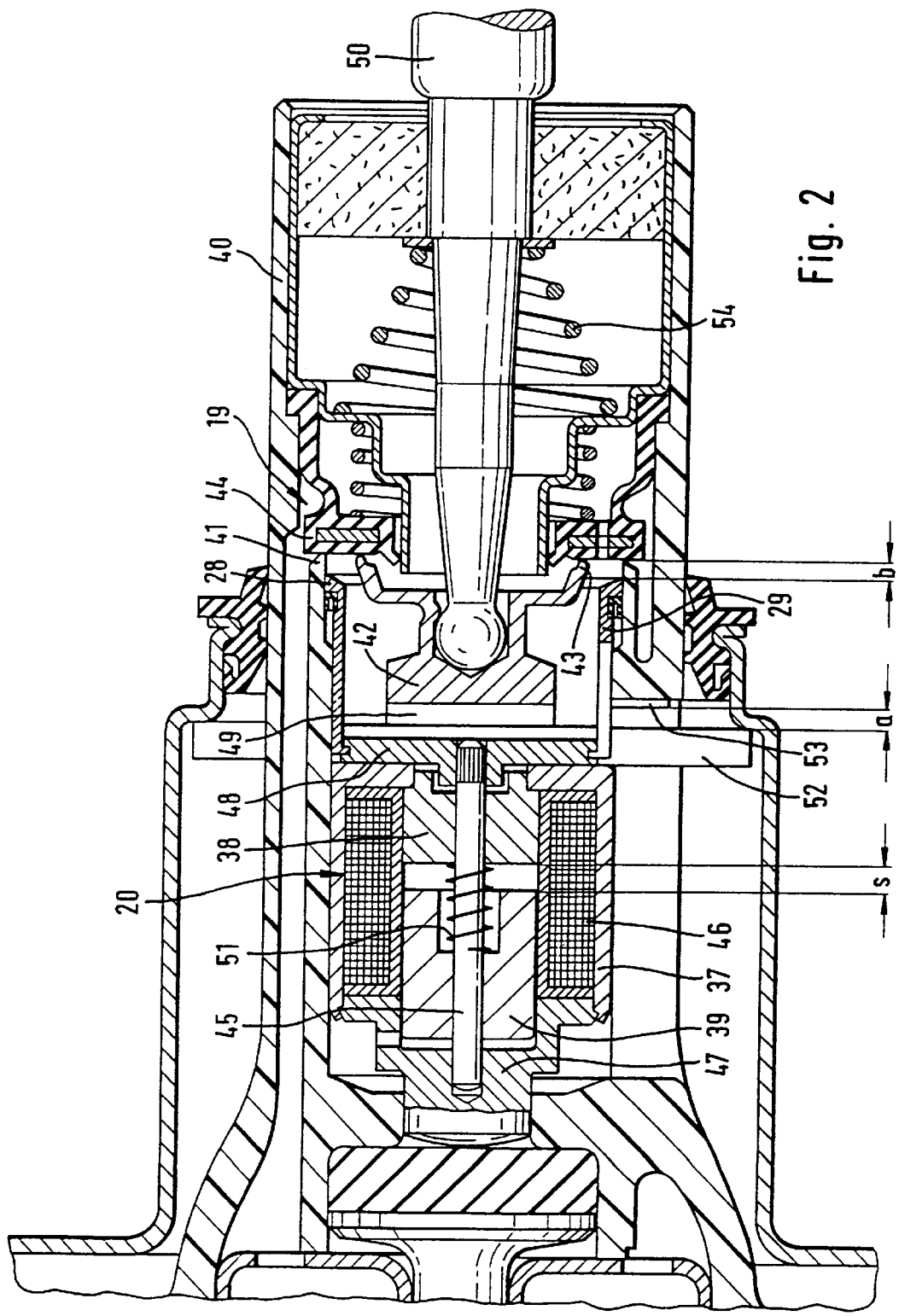
FIG. 2 is an axial view, partly broken away, of the control group of the pneumatic brake power booster of FIG. 1.

As is shown especially in FIG. 2, the control valve 19 is accommodated in a control housing 40 sealed and guided in the housing of the brake power booster 2 and has a first sealing seat 41 on the control housing 40, a second sealing seat 43 that is provided on the valve piston 42 connected to the actuating rod 5, and a valve member 44 cooperating with both sealing seats 41, 43.

To initiate operation of the brake power booster 2 independent of the actuating rod 5, a third sealing seat 28 is interposed radially between the first, 41, and the second sealing seat 43. Sealing seat 28 is operable by way of the solenoid 20 which is preferably arranged in a housing 37, provided by an axial bowl-shaped extension of the valve piston 42, and is slidable in the control housing 40 along with the valve piston 42.

The solenoid 20 includes a coil 46, slipped onto a guide member 38 attached inside the housing 37, and a cylindrical armature 39 slidable in the coil. Armature 39 is undetachably connected to a pin 45 which is guided in the guide member 38, on the one hand, and in a closure member 47 closing the housing 37, on the other hand. A pole surface, which is provided on the guide member 38 axially opposite the armature 39, may preferably be a male taper to achieve a linearisation of the force-travel characteristics of the solenoid 20. At its end close to the actuating rod 5, the pin 45 carries a force-transmitting plate 48 which preferably has a rectangular design and is arranged in a radial groove 49 of the valve piston 42. Plate 48 permits transmitting the independent actuating force generated by the solenoid 20 to the third sealing seat 28. To this end, the third sealing seat 28 is provided on a sleeve 29 which is guided and sealed in the control housing 40 and connected to the force-transmitting plate 48. A compression spring 51 is interposed between the armature 39, which projects partly into the closure member 47, and the guide member 38. Spring 51 retains the armature 39 in in its initial position, where the third sealing seat 28 is axially offset (see distance 'b') with respect to the second sealing seat 43 provided on the valve piston 42.

In an independent braking operation initiated by energization of the coil 46, the armature 39 is displaced to the right in the drawing in opposition to the force of the compression spring 51, with the result that the third sealing seat 28 moves into abutment with the sealing surface of the valve member 44 after having overcome the distance 'b'. The first sealing seat 41 on the control housing 40 is bridged in terms of effect by this abutment so that the connection between the pneumatic chambers (not shown) of the brake power booster 2 is eliminated. Subsequently, the third sealing seat 28 and the valve member 44 continue in joint motion, the second sealing seat 43 is opened, and the ventilatable chamber of the brake power booster 2 is ventilated. The movement of the third sealing seat 28 continues until the armature 39 abuts the guide member 38 and the slot 's' between the two parts becomes zero. In the absence of actuating force on the actuating rod 5, the control housing 40 will advance in relation to the valve piston 42 by a distance which corresponds to the distance 'a' between a transverse member 52, limiting the movement of the valve piston 42, and a stop surface 53 on the control housing 40. This is due to a piston rod return spring 54 which moves the valve piston 42 to the right by way of the actuating rod 5 and tends to close the second sealing seat 43 again. Because the third sealing seat 28 is moved synchronously due to the rigid connection between the solenoid 20 and the valve piston 42, the slot between the valve member 44 and the second sealing seal 43 is kept open, more precisely, by the amount 's-b'. The ventilatable chamber of the brake power booster 2 is thereby connected to the atmosphere, and brake force is generated.

After deactivation of the solenoid 20, the armature 39 with the third sealing seat 28 moves to the left by the action of spring 51, with the result that the third sealing seat 28 is opened and the valve member 44 closes the second sealing seat 43. Because the first sealing seat 41 stays open (as mentioned above), atmosphere is removed from the ventilatable chamber by way of the open connection between the pneumatic chambers so that the pressure prevailing in the master brake cylinder 3 is reduced.

The ventilatable chamber is vented by way of the open first sealing seat 41 until the control group returns to its initial position and the transverse member 52 abuts on the housing of the brake power booster 2. The control housing 40 can move until it bears against the left-hand side (in the drawing) of the transverse member 52 and the first sealing seat 41 is closed. The unit is then in the release position.

Figure 3:
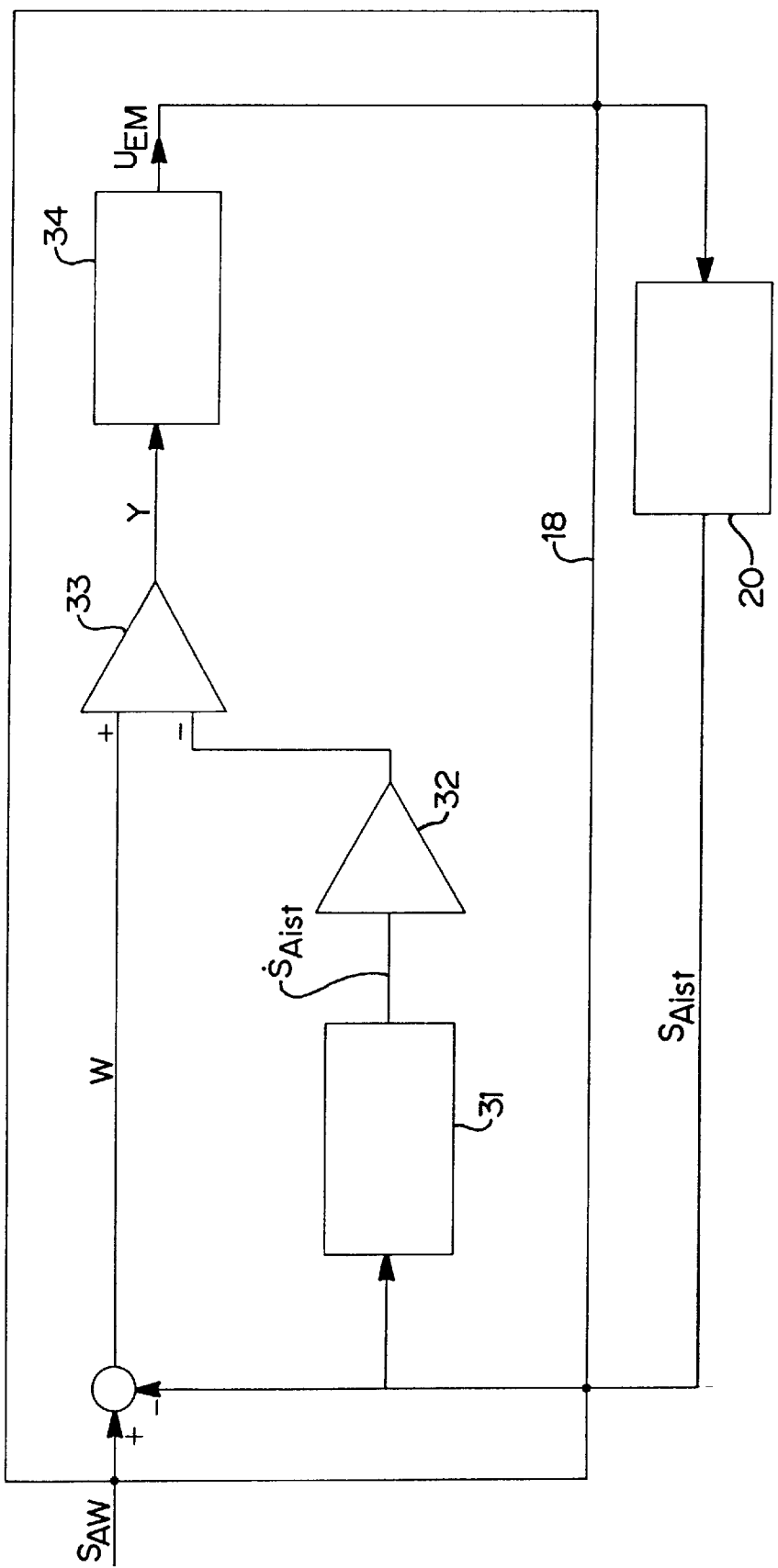
FIG. 3 is a block diagram of a first embodiment of the control structure connected downstream of the deceleration controller of FIG. 1.

FIG. 3 shows the detailed structure of the control structure 59 connected downstream of the above-mentioned deceleration or braking pressure controller 8, that the control difference $\Delta S$ produced in the second summer 25 is compared in a third summer 30 with a weighted signal $\dot{S}_{Aistg}$ which represents the actual speed of the armature 39 of the solenoid 20. The weighted signal $\dot{S}_{Aistg}$ in the embodiment shown is produced by a time differentiation processing operation of the signal $S_{Aistg}$ representative of the actual armature travel in a differentiator 31. Connected downstream of differentiator 31 is a proportional member 32 which ensures attenuation of the output signal $\dot{S}_{Aistg}$ of the differentiator 31. The control difference W which is the result of the comparison between the two signals ΔS and $\dot{S}_{Aistg}$ is sent to a comparator 33, which forms the above mentioned position controller 18. Comparator 33 activates and deactivates the voltage $U_{EM}$ which is amplified in a final stage 34 and is to be sent to the solenoid 20.

Figure 4:
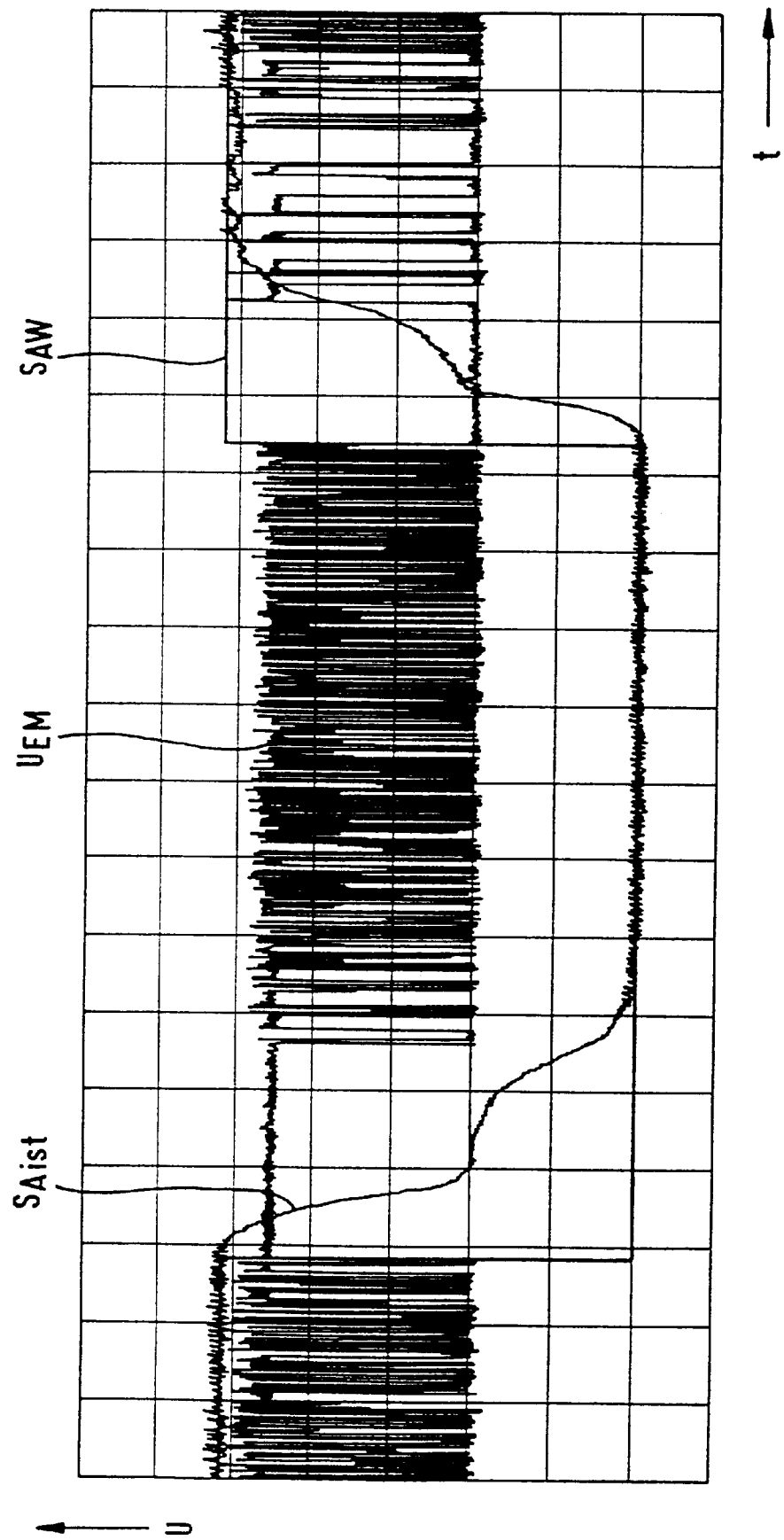
FIG. 4 is a diagram showing quantities which occur during a control operation.

The variations of the above mentioned quantities occurring in a control operation can be seen in the diagram shown in FIG. 4.

Figure 5:
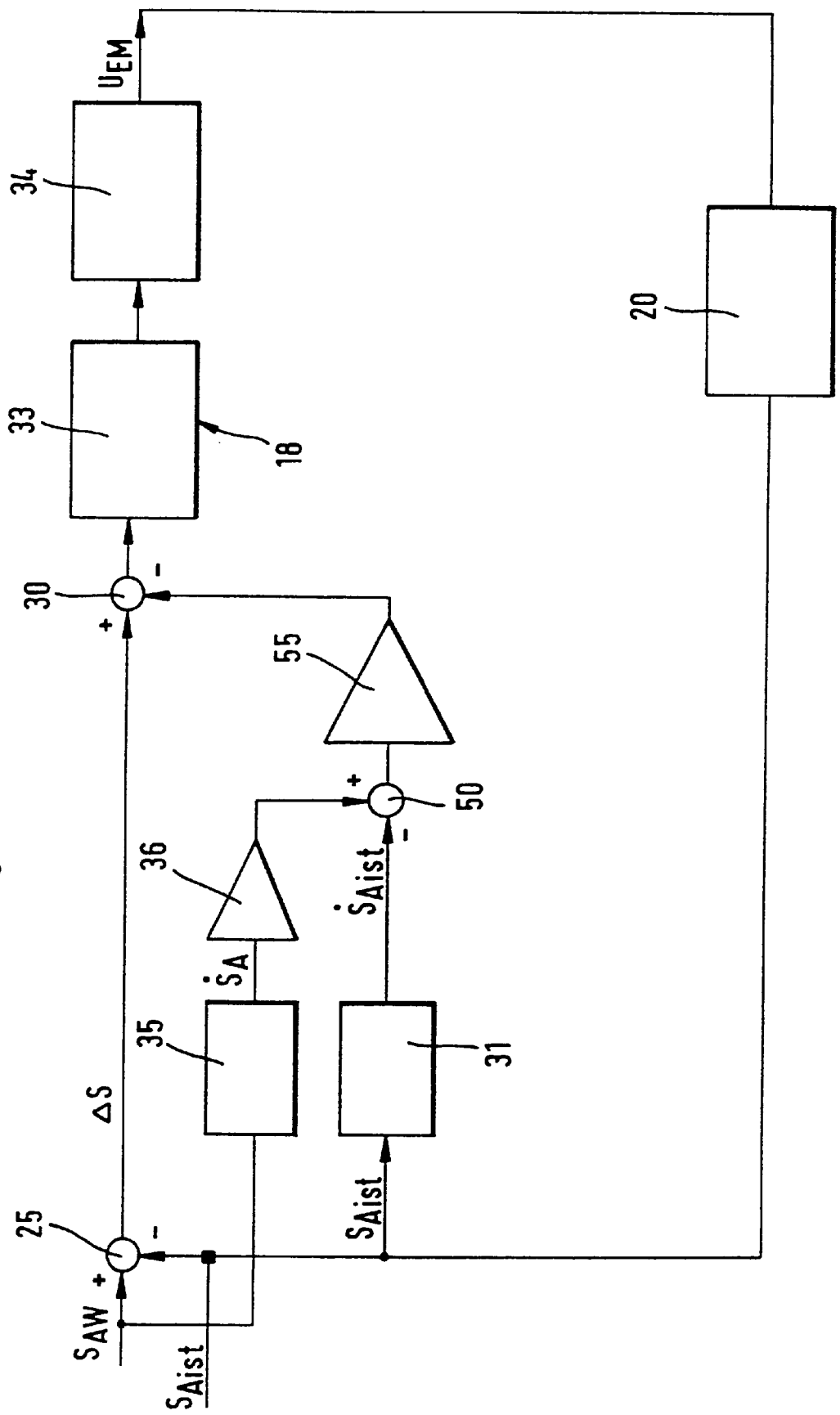
FIG. 5 is a block diagram of a second embodiment of the control structure connected downstream of the deceleration controller of FIG. 1.

In the second embodiment of the control structure connected downstream of the deceleration controller 8, shown in FIG. 5, a second differentiator 35 is connected in parallel to the differentiator 31 mentioned with respect to FIG. 3. In differentiator 35, the signal $S_{AW}$ representative of the desired travel of the armature 29 is subjected to a time differentiation processing operation. Subsequently, after attenuation in a second proportional member 36, the signal $S_{AW}$ along with the output signal $\dot{S}_{Aistg}$ of the first differentiator 31, is sent to a fourth summer 50. The result of the comparison performed in summer 50, after attenuation in a third proportional member 55, is sent to the second summer 30.

In the third embodiment of the control structure connected downstream of the deceleration controller 8, shown in FIG. 6, another additional signal $S_{Aist}$ which represents the actual acceleration of the armature 39 of the solenoid 20 is still taken into account for the control. This additional signal $S_{Aist}$ is produced together with the above mentioned signal $S_{Aist}$ representative of the actual speed of the armature 39 in an observer 56. After attenuation in each proportional member 57 or 58, both signals are sent to the second summer 30 again.

I claim:

1. A brake system for automotive vehicles with an actuating unit including a pneumatic brake power booster and a master brake cylinder connected downstream of the booster and connected to wheel brakes, wherein a control valve of the brake power booster is operable irrespective of the driver's wish by a solenoid having an armature that is in force-transmitting connection with a sealing seat of the control valve, a deceleration controller to which a signal representative of the vehicle deceleration is sent as an input quantity, wherein the output quantity of the controller influences the position of the control valve and is compared in a first summer with a signal representative of the actual condition of the control valve, and the control difference representative of the result of the comparison is sent to a position controller which influences the position of the control valve and the output quantity of which corresponds to an electric current to be supplied to the solenoid, wherein the position controller is a comparator connected upstream of which is a second summer wherein the output quantity of the deceleration controller is compared with a weighted signal representative of the speed of the armature, wherein the output quantity of the deceleration controller corresponds to the position of the armature relative to the housing of the solenoid, and wherein a travel signal representative of the actual condition of the control valve represents the actual position of the armature in relation to the housing of the solenoid.

2. The brake system of claim 1,
wherein the signal representative of the speed of the armature is produced in a differentiator by a time differentiation processing operation of the travel signal which corresponds to the actual condition of the control valve.

3. The brake system of claim 2,
wherein a proportional member is connected downstream of the differentiator.

4. The brake system of claim 2
wherein there is provision of a second differentiator wherein the output quantity of the deceleration controller is subjected to a time differentiation processing operation, and the output signal thereof, along with the signal representative of the speed of the armature, is sent to a summer, connected downstream of which is a proportional member whose output quantity is supplied to the second summer.

5. The brake system of claim 2,
wherein the signal representative of the speed of the armature is produced in an observer.

6. The brake system of claim 5,
wherein a proportional member is connected downstream of the observer.

7. The brake system of claim 5,
wherein a signal representative of the acceleration of the armature is obtained from the observer and is sent to a second proportional member having an output signal which is additionally compared in the second summer with the output quantity of the deceleration controller.

8. The brake system of claim 1,
wherein the position controller is a quick-acting digital circuit.

9. The brake system of claim 8,
wherein the quick-acting digital circuit has an invariable logic.

10. The brake system of claim 8,
wherein the quick-acting digital circuit includes freely progammable elements.

* * * * *